(No Model.)

W. SYKES.
PIPE JOINT.

No. 515,627.  Patented Feb. 27, 1894.

Witnesses
H. Bingham
W. Cross.

Inventor
W. Sykes

UNITED STATES PATENT OFFICE.

WILLIAM SYKES, OF LONDON, ENGLAND.

PIPE-JOINT.

SPECIFICATION forming part of Letters Patent No. 515,627, dated February 27, 1894.

Application filed August 5, 1892. Serial No. 442,268. (No model.) Patented in England September 19, 1891, No. 15,901.

*To all whom it may concern:*

Be it known that I, WILLIAM SYKES, a subject of the Queen of Great Britain and Ireland, residing at Walham Green, London, in the county of Middlesex, England, have invented Improvements in Pipe-Joints, (for which I have obtained Letters Patent in Great Britain, No. 15,901, dated September 19, 1891,) of which the following is a specification.

This invention has reference to improvements in the construction of joints for pipes that are formed of material such as stoneware, concrete and earthenware and suitable for use as sewer pipes. According thereto the adjacent ends of the pipes are formed the one as a spigot with a male thread, and the other as a socket with a corresponding female thread, and a fluid tight joint is formed by means of a washer of suitable elastic or yielding material arranged to be compressed between the pipe ends when the two are screwed together.

Figure 1:
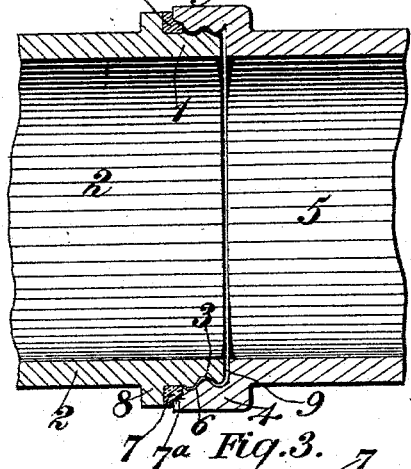
Figure 2:
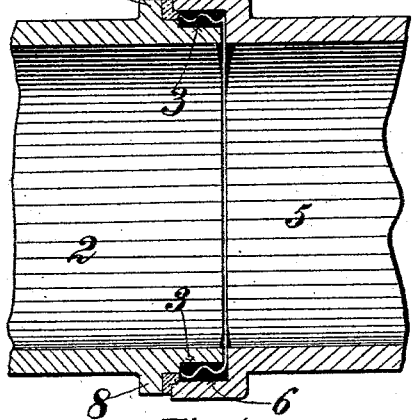
Figure 3:
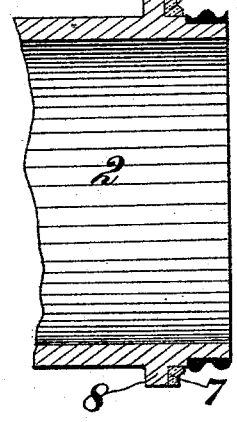
Figure 4:
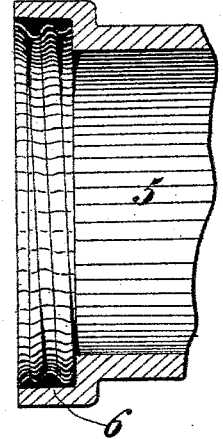
Figure 5:
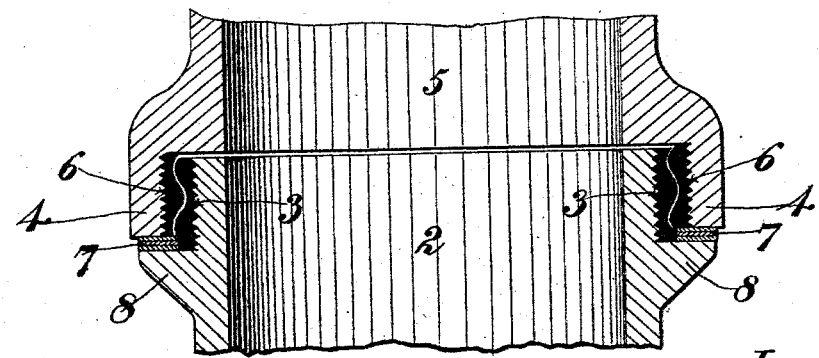

In the accompanying drawings, Figure 1 is a longitudinal section of a pipe joint according to this invention suitable for pipes of material such as concrete, that do not require to be burned. Fig. 2 is a similar view of a pipe joint suitable for pipes of material such as earthenware or stoneware that require to be burned. Figs. 3 and 4 are detached longitudinal sections of the spigot and socket portions respectively of the pipe joint shown in Fig. 2. Fig. 5 is a longitudinal section illustrating a modified construction of pipe joint.

Referring to Fig. 1, the spigot 1 of the pipe 2 has formed in one therewith, by molding or casting, a male screw thread 3, and the socket 4 of the adjacent pipe 5 has formed in one with it a corresponding female screw thread 6. 7 is a washer of suitable elastic or yielding material such as india rubber or vulcanite arranged between a collar 8 on the pipe 2, and the adjacent end of the socket 4 so as to form a fluid tight joint between them. This washer may with advantage be made with a conical surface at 7ª against which bears the correspondingly formed end of the socket 4. Or the washer may be placed in the space 9 between the end of the spigot 1 and the adjacent part of the pipe 5 so as to be compressed between the two when the two lengths of pipe are screwed together. In this case the collar 8 can be dispensed with. In the construction shown in Figs. 2, 3 and 4, the male and female screw threaded parts 3 and 6 are formed of material capable of being molded or cast in place around the spigot and within the socket respectively, by the aid of suitably formed molds. Suitable material for this purpose comprises gas tar, pitch, silver or fine sand, and sulphur. These substances are mixed and boiled together and then run while hot into place between a suitably formed mold and the spigot or socket as the case may be.

The proportions of the substances mentioned can be varied according to circumstances in order to produce a tubular screw threaded part that will firmly adhere to the exterior of the spigot and the interior of the socket and which shall not be liable to crack. The male and female screw threads may also be formed of cement or other suitable material capable of being molded in place and of sufficient strength to admit of the pipes being screwed tightly together.

In the construction shown in Fig. 5, the exterior surface of the spigot and the interior surface of the socket are shown notched or serrated in order to increase the adhesion between these surfaces and the plastic material employed to form the male and female screw threads 3 and 6. The washers 7 are in this arrangement shown as arranged between the collar 8 on the pipe 2 and the end of the socket 4 and the internally screw threaded tubular part 6 applied thereto.

The screw threads may be straight or slightly tapered. To assist the screwing of the adjacent pipes together, the spigot and socket may have lubricating material such as tallow applied thereto, and the screw threads, which may advantageously be of rounded form as shown, are made to loosely fit each other in order that they may be readily screwed home and compress the elastic washer, without the least danger of injuring the threads. By thus forming the threads so that they fit each other loosely, that is, so that there will be a space between the sides of the threads which do not receive the thrust of the elastic washer, the connection between the pipes will be flexible and permit a slight movement of the pipes within each other at their connections, which enables them to settle on their foundation without injuring the screw-threads or in the least impairing the water or gas-tight joint. Should the foundation on which the pipes rest be poor, and the pipes settle sufficiently to crack or injure the screw-threads, the elastic ring or washer would not be injured, and the water tight joint would still be preserved.

I am aware that it is not new to form tightly fitting screw-joints on earthen ware pipes, the threads forming the water-tight joint, as this construction is shown in English Patent No. 12,018 of August 20, 1888, issued to H. M. Ramsay. I am also aware that it is not new to use an elastic washer in connection with earthen ware pipe-joints of that variety wherein the parts are simply inserted one within the other, and a filling of cement run into a cavity formed between the engaging ends of the pipes to complete the joint, the elasticity or flexibility of the joint in this construction lasting only until the cement sets. This class of devices is shown in English patent to Doulton, dated December 24, 1884, and No. 15,860, and United States patent to Hubbart, No. 340,046, of April 13, 1886. But in my invention I provide loosely fitting screw threads which are used as a means for compressing my elastic water-proof washer at the joint of the pipes. I do not afterward fill the joint with cement or asphaltum, as my washer makes the joint completely water-proof, and permanently flexible, and permits the pipes to assume positions at slight angles to each other after they have been laid. Another advantage of dispensing with the cement filling commonly used is that the pipes may be separated and taken up when desired without breaking them, which is not possible with that class of pipes wherein cement filling is relied on to complete the joint.

What I claim is—

1. A screw joint for earthen ware pipes comprising a spigot and socket, corresponding male and female screw-threads formed on the spigot and socket respectively, said threads being adapted to fit loosely together to form a flexible connection between the pipes, and an elastic washer adapted to be compressed between the ends of the pipes, whereby a flexible water-tight joint is formed and the pipes are permitted to assume positions at slight angles to each other, substantially as described and for the purpose set forth.

2. A screw joint for earthen ware pipes comprising a spigot and socket, corresponding male and female screw-threads formed on the spigot and socket, respectively, said threads being adapted to fit loosely together and form a flexible joint between the pipes, an outwardly extending annular flange formed on the spigot, an elastic water-proof ring or washer arranged to be compressed between the annular flange and the end of the socket, whereby a flexible water-proof joint is formed, said washer being adapted to contract or expand and maintain a water-tight joint whether the pipes are axially in line or at slight angles to each other, substantially as described.

In testimony whereof I have signed my name to this specification in the presence of two subscribing witnesses.

WILLIAM SYKES.

Witnesses:
ARTHUR WOOSNAM,
46 *Lincoln's Inn Fields.*
WM. THOS. MARSHALL,
2 *Pope's Head Alley, Cornhill, London, E. C.*